United States Patent [19]
Coppock

[11] 3,927,721
[45] Dec. 23, 1975

[54] ADJUSTABLE WEEDING HOE

[76] Inventor: Alden D. Coppock, 1207 Peppertree Lane, Fallbrook, Calif. 92028

[22] Filed: Feb. 13, 1974

[21] Appl. No.: 442,047

[52] U.S. Cl. ............ 172/371; 56/400.2; 145/61 D; 145/61 M; 172/372; 403/166; 403/229; 403/235
[51] Int. Cl.² ... A01B 1/08; A01B 1/22; B25G 1/02; B25G 3/38
[58] Field of Search ............................ 172/371–374, 172/376, 378; 56/400.17–400.20; 145/61 M, 61 D, 2 R; 30/171, 121; 7/1 P; 81/1; 403/220, 229, 235, 166; 15/144 R, 143 R

[56] References Cited
UNITED STATES PATENTS

| | | | |
|---|---|---|---|
| 53,332 | 3/1866 | Plumer | 172/372 |
| 61,446 | 1/1867 | Newton | 15/143 R |
| 133,151 | 11/1872 | Harriman | 172/372 |
| 281,003 | 7/1883 | Benton | 56/400.19 X |
| 603,550 | 5/1898 | Boyer | 403/235 X |
| 604,379 | 5/1898 | Flyckt | 403/229 X |
| 1,198,767 | 9/1916 | Reese | 172/371 |
| 1,203,886 | 11/1916 | Long | 403/229 |
| 1,818,886 | 8/1931 | Erickson | 403/146 |
| 1,925,617 | 9/1933 | Warren | 403/229 X |
| 1,933,625 | 11/1933 | Houland | 172/372 |
| 2,064,448 | 12/1936 | Rieff | 172/374 X |
| 2,211,682 | 8/1940 | Yeoman | 145/61 M X |
| 2,268,066 | 12/1941 | Brooke | 56/400.17 X |
| 2,282,932 | 5/1942 | Burnett | 403/166 X |
| 2,768,437 | 10/1956 | Ronjan et al. | 30/121 |
| 2,776,478 | 1/1957 | Mercer | 30/171 UX |

FOREIGN PATENTS OR APPLICATIONS

| | | | |
|---|---|---|---|
| 650,816 | 3/1951 | United Kingdom | 403/220 |
| 500,889 | 9/1928 | Germany | 403/220 |

Primary Examiner—Edgar S. Burr
Assistant Examiner—Steven A. Bratlie
Attorney, Agent, or Firm—Knobbe, Martens, Olson, Hubbard & Bear

[57] ABSTRACT

A weeding and cultivating hoe is provided with a spring biased movable interconnection between the handle and blade to alleviate strain on the implement user and to increase the effectiveness of the implement. The spring bias is adjustable and the orientation of the blade relative to the implement handle is also adjustable, these adjustments increasing the user's comfort and the effectiveness of the implement.

4 Claims, 4 Drawing Figures

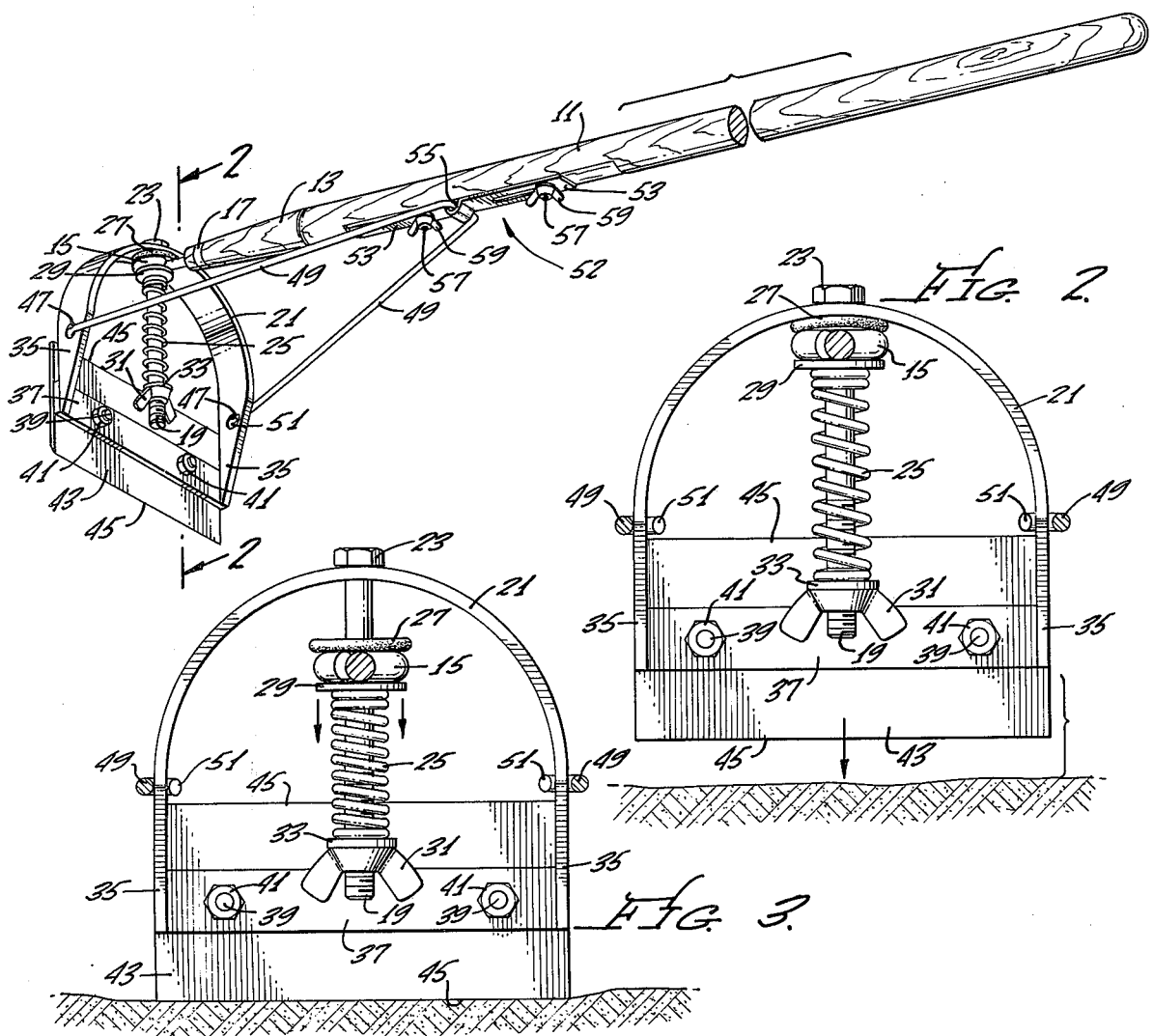

3,927,721

ADJUSTABLE WEEDING HOE

BACKGROUND OF THE INVENTION

Standard hoes and similar implements have generally been constructed in the past by mounting a blade or scarifying element at right angles to an elongate handle to produce a rather crude implement which has been used for many years, particularly for removing unwanted vegetation from the earth's surface and for cultivating between and around plants. Although such implements are relatively easy to manufacture and therefore fairly inexpensive, it has been found that they quickly fatigue the tool user due to the stiff interconnection of the blade and the handle causing a jarring motion as the implement is used. In addition, such tools are relatively inefficient and cause user fatigue due to the inability of the user to adjust either the angle of the blade to the implement handle or the degree of stiffness of the interconnection between the handle and the blade. It has therefore been found that the tool may only be used for a relatively short period of time before an operator becomes fatigued to the point where the tool's use is no longer effective.

In addition it has been found that the unyielding interconnection between the handle and blade of this common implement increases the tendency of the tool to bounce and skip along the ground rather than to scrape along the surface of the ground so that the tool is not effective as a scraping implement.

SUMMARY OF THE INVENTION

The present invention is directed toward alleviating these shortcomings of prior art implements by substantially reducing the shock transmitted to the tool user, therefore increasing the user's comfort and increasing the effectiveness of the implement. In addition, the rigidity of the interconnection between the blade and the implement handle is made adjustable so that the operator may change the tool stiffness in accordance with the conditions of the ground being worked or the operator's own comfort. Similarly, the angular interrelationship between the blade and the tool handle is adjustable to provide maximum comfort for a particular user and to additionally provide for an adjustment to alternatively scrape or to scarify the surface.

Since both the user's comfort and the effectiveness of the implement itself are substantially increased by the present invention, it is possible for a user both to increase the time period over which he can use such an implement and to increase his efficiency during such use.

These and other advantages of the present invention are best understood by reference to the drawings, in which:

FIG. 1 is a perspective view of the improved hoe of the present invention;

FIGS. 2 and 3 are sectional views taken along lines 2—2 of FIG. 1 showing the implement with the spring in the relaxed and flexed positions, respectively; and FIG. 4 is a side elevation view of the hoeing implement of the present invention showing a first position of adjustment in solid lines and a second position of adjustment in broken lines.

DETAILED DESCRIPTION OF THE PREFERRED EMBODIMENT

Referring initially to FIG. 1, the preferred embodiment of the present invention is shown as including an elongate handle 11 typically constructed from wood and being of sufficient length to permit easy manipulation of the hoeing head along the ground by a user standing erect. The handle 11 is generally tapered at the end 13, which end 13 includes a concentric bore (not shown) which receives the elongate extension of a standard eye bolt 15. The eye bolt 15 may be rigidly attached within the end of the handle 11 by placing a collar 17 around the tapered end 13, which collar 17 may be permanently clamped tightly to engage the wood of the tapered end 13 snugly around the eye bolt 15.

The eye of the eye bolt 15 is dimensioned to have an aperture which loosely receives a bolt 19, and the plane of the eye bolt is substantially parallel to the surface of the ground when the implement is in use, as shown in FIG. 1. The bolt 19 is positioned through the eye bolt 15 and thus serves to axially align a U-shaped yoke 21 which includes an aperture (not shown) at its midpoint for snugly receiving the bolt 19 near its head 23.

Beneath the eye bolt 15 and positioned around the shank of the bolt 19 is a compression spring 25. Likewise positioned around the shank of the bolt 19 is a soft fabric washer 27 which is positioned between the eye bolt 15 and the yoke 21. A rigid washer 29 is advantageously positioned between the eye bolt 15 and the spring 25 around the shank of the bolt 19 in order to permit proper seating of the upper end of the compression spring 25 against the eye bolt 15. A large wing nut 31 is threaded onto the lower end of the bolt 19 and, with the use of an interposed washer 33, permits easy adjustment of the compression of the spring 25.

It will be recognized from the previous explanation that the eye bolt 15 is biased toward the head 23 of the bolt 19 by the spring 25 and that this bias can be adjusted by turning the wing nut 31. The eye bolt 15 is, however, free to move axially along the shank of the bolt 19, since, as previously explained, it is loosely fitted about the shank. If, therefore, the end 13 of the handle 11 is pressed downward while the head of the hoe is maintained in a fixed position, the eye bolt 15 will move axially down the bolt 19 against the bias of the spring 25 so that a separation occurs between the eye bolt 15 and both the head 23 of the bolt 19 and the U-shaped yoke 21.

The U-shaped yoke 21 includes tapered ends 35 which are rigidly attached, as by welding, to a cross bar 37 which is utilized to mount the hoeing blade. The cross bar 37 advantageously includes a pair of openings (not shown) for receiving a pair of through bolts 39 which are threaded to a pair of nuts 41 to rigidly attach a blade 43 which includes matching holes for receipt of the two bolts 39. The blade 43 advantageously includes a pair of serrated edges 45 for scraping and scarifying the surface of the ground. It will be recognized that these edges 45 will dull somewhat during use and the blade may be rotated 180° in position to utilize the second edge 45 when the first edge 45 has dulled. This double edged blade, therefore, substantially increases the useful life of the hoeing implement between sharpening operations.

From the foregoing it will be recognized that, since the blade 43 is rigidly attached to the yoke 21, the blade 43 is adapted to move substantially vertically as shown in FIG. 1 relative to the end 13 of the handle 11. Thus, during use, if the operator strikes the head of the hoe against the ground with a downward motion of the end 13 of the handle 11, the head of the hoe and the blade 43 will stop abruptly when striking the ground but the end 13 of the handle 11 may continue beyond the point of impact against the compression of the spring 25 in order to dampen the shock of striking the ground which would otherwise be directly transferred to the handle 11. This relative motion is shown in FIGS. 2 and 3, FIG. 2 showing the normal relationship between the blade 43 and eye bolt 15, and FIG. 3 showing their relative positions on impact of the blade 43 with the ground. The spring 25 in FIG. 3 has been compressed by motion of the U-shaped yoke 21 away from the eye bolt 15. Movement of the blade 43 relative the handle 11 is limited in one extreme by the head 23 of the bolt 19, and in the other extreme by complete compression of the spring 25. It will also be recognized that, during a relatively horizontal scraping of the ground by the edge 45 of the blade 43, if the ground is somewhat uneven, a vibratory motion will be induced in the blade 43. This vibration will be damped rather than directly transmitted to the handle 11 since a relative motion will occur between the yoke 21 and the eye bolt 15 against the bias of the spring 25.

By adjusting the wing nut 31 the degree of bias of the eye bolt 15 against the yoke 21 caused by the spring 25 may be varied so that the hoe may be adjusted for varying ground conditions to increase the comfort of the operator to the maximum extent.

The tapered ends 35 of the yoke 21 include single apertures 47 which receive, respectively, the two ends of an adjusting and supporting member 49 which is generally U-shaped and preferably constructed from spring steel such that its ends 51, when placed respectively in the apertures 47, will be biased to remain in these apertures 47. The center section of the adjusting member 49 is positioned adjacent the handle 11 and is received in a hinge member 52, best seen in FIG. 4, which includes a pair of flat plate sections 53 and a rounded center section 55 adapted to loosely receive the center section of the adjusting member 49. This interconnection must be sufficiently loose that when the hoe blade 43 moves vertically relative to the end 13 of the handle 11, the adjusting member 49 may pivot at the U-shaped section 55 of the hinge member 52. The hinge member 52 preferably includes a pair of elongate slots for receiving the ends of a pair of bolts 57 which pass through the handle 11 and receive a pair of wing nuts 59 which are used to hold the hinge member 52 against the handle 11. The handle 11 may be advantageously flattened at the bottom along that portion of its length which is designed to receive the hinge member 52 so that a firm interengagement of the hinge member 52 and the handle 11 may be achieved by tightening the wing nuts 59. In addition, it has been found advantageous to include on the upper surface 61 of the hinge member 52 a roughened or serrated surface (not shown) so that when the wing nuts 59 are tightened, the roughened surface 61 will engage the handle 11 to assure that no movement of the hinge member 52 along the axis of the handle 11 occurs.

The adjusting member 49 determines the orientation of the hoe head relative the handle 11 and may be used to adjust the angle between the blade 43 and the handle 11. Thus, for example, when the hinge member 52 is moved to its furthest extremity permitted by the slots which receive the bolt 57 toward the handle end 13, as shown in solid lines in FIG. 4, the blade 43 will be approximately perpendicular to the handle 11. On the other hand, when the hinge member 52 is moved to the opposite extremity away from the end 13 of the handle 11, as shown in broken lines in FIG. 4, the angle between the blade 43 and the axis of the handle 11 will become substantially more acute so that the cutting edge 45 of the blade 43 will be directed back toward the operator. In each position, as explained above, the member 49 is utilized to maintain the proper orientation of the blade 43 and the yoke 21 even while the spring 25 is compressed, through the pivoting action which occurs at the hinge member 52. The eye bolt 15 has a large enough eye to permit the pivoting of the bolt 19 which results from adjusting the hinge member 52. The bolt 19 and eye bolt 15 thus act as a pivotal mount for the blade 43, permitting the blade 43 to pivot about an axis parallel to the surface of the earth, as shown in FIG. 1.

The height of various users of this hoeing implement will vary, and it is therefore advantageous for each such operator to adjust the hinge member 52 by loosening the wing nuts 59 and moving the hinge member 52 along the axis of the handle 11 until the angle of the blade 43 relative the handle 11 is proper when this particular operator is using the implement. It has also been found that for different operations different angular relationships between the blade 43 and the handle 11 are convenient. Thus, for example, when scraping the surface of relatively hard earth it may be advantageous to have the blade 43 approximately at right angles to the surface of the earth. When, however, it is desired to slightly scarify softer ground, it may be advantageous to move the hinge member 52 away from the end 13 of the handle 11 so that the blade 43 will tend to dig under the earth as the implement is drawn toward the operator.

The fabric washer 27 is utilized to decrease both the shock and the noise which is created when the eye bolt 15 impacts against the yoke 21 after a hoeing stroke, thus deadening both the vibration and the noise caused by this impact.

It has been found that the capability of this tool to be adjusted, in terms of the angle of the blade 43 relative the ground and the handle 11, and the ability of the user to adjust the bias of the spring 25 to varying ground conditions and to maximize user comfort, has enabled the user of this implement to produce a more satisfactory result than previously achieved. Thus, it is possible, due to the damping of the vibrations within the handle 11, to utilize this implement for a substantially longer period of time than was previously possible. In addition, the adjustability of the angle of the blade 43 relative the handle 11 makes the tool operate satisfactorily for a variety of hoeing jobs in a variety of soil conditions.

Also noteworthy is the fact that the spring bias between the handle 11 and the yoke 21 permits the blade 43 to remain adjacent the surface of rough ground as the implement is drawn across this surface, rather than exhibiting the skipping or bouncing motion which is often observed in the use of a standard hoe.

What is claimed is:
1. An implement for scraping the surface of the ground, comprising:
   an elongate handle having an axis;

a blade including an edge designed to scrape the surface of the ground, said blade lying substantially in a plane;

means connected to one end of said handle for mounting said blade for pivotal movement about an axis perpendicular to the axis of said handle, said mounting means including guiding means for guiding movement of said one end of said handle in a direction toward and away from said blade, said guiding means including a spring for biasing said handle in a direction away from said blade;

a stabilizing arm having one end pivotally connected to said blade at a point removed from said pivotal axis; and means for selectively pivotally connecting the other end of said stabilizing arm to said handle at a plurality of positions along the axis of said handle for adjusting the angle between the plane of said blade and the axis of said handle.

2. An implement as defined in claim 1 wherein said mounting means and included guiding means comprises:

an eye bolt mounted to said one end of said handle, the plane of said eye bolt being approximately parallel to the axis of said handle;

a bolt passing through the eye of said eye bolt; and means for attaching said bolt to said blade.

3. An implement as defined in claim 2 wherein the diameter of said bolt is less than the diameter of the eye of said eye bolt and said bolt provides a path for movement of said end of said handle toward and away from said blade.

4. A hoeing implement comprising:

an elongate handle having an axis;

an eye bolt rigidly attached to one end of said handle, the eye of said eye bolt lying in a plane parallel to the axis of said handle;

a blade having an edge adapted to scraping the surface of the ground;

a U-shaped yoke, the ends of which are rigidly attached to said blade and each include first apertures, the center of said yoke including a second aperture overlying the eye of said eye bolt on the side of said eye bolt away from said blade;

a bolt passing through said eye bolt and said second aperture, said bolt having sufficient length to permit said eye bolt and said yoke to slide relative to one another along said bolt, the head of said bolt overlying said yoke;

an adjusting nut threaded onto said bolt;

a compression spring surrounding said bolt between said eye bolt and said adjusting nut, the compression of said spring adjusted by said adjusting nut, said spring biasing said eye bolt against the underside of said yoke;

an adjusting member pivotally connected to said first apertures; and means for pivotally mounting said adjusting member at plural locations along the axis of said handle.

* * * * *